(12) United States Patent
Oh et al.

(10) Patent No.: US 12,229,564 B2
(45) Date of Patent: Feb. 18, 2025

(54) CONTROL SYSTEM OF AUTONOMOUS VEHICLE AND CONTROL METHOD OF AUTONOMOUS VEHICLE

(71) Applicants: Hyundai Motor Company, Seoul (KR); Kia Corporation, Seoul (KR)

(72) Inventors: Tae Dong Oh, Seoul (KR); Hae Ryong Lee, Gyeonggi-do (KR); Sung Woo Choi, Seoul (KR); Wan Jae Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 484 days.

(21) Appl. No.: 17/543,198

(22) Filed: Dec. 6, 2021

(65) Prior Publication Data

US 2022/0179656 A1 Jun. 9, 2022

(30) Foreign Application Priority Data

Dec. 7, 2020 (KR) .................. 10-2020-0169677

(51) Int. Cl.
*G06F 9/38* (2018.01)
*B60W 60/00* (2020.01)
*G06F 9/48* (2006.01)
(52) U.S. Cl.
CPC ........... *G06F 9/3851* (2013.01); *B60W 60/00* (2020.02); *G06F 9/4881* (2013.01)
(58) Field of Classification Search
CPC .... G06F 9/3851; G06F 9/4881; B60W 60/00; B60W 60/001; B60W 50/00; B60W 2050/0005; B60W 40/02; B60W 2050/0002; B60W 2420/00; B60W 2556/45; G05D 1/0088; B60Y 2400/30
See application file for complete search history.

(56) References Cited

U.S. PATENT DOCUMENTS

| | | | |
|---|---|---|---|
| 2019/0205218 A1* | 7/2019 | Bailey | G06F 11/181 |
| 2019/0230522 A1* | 7/2019 | Sugaya | B60W 10/20 |
| 2021/0405651 A1* | 12/2021 | Pan | G05D 1/248 |
| 2022/0038393 A1* | 2/2022 | Roy | H04L 49/3063 |
| 2022/0141701 A1* | 5/2022 | Tsushima | H04L 43/0888 370/252 |
| 2023/0401911 A1* | 12/2023 | Zhu | G06V 20/58 |
| 2024/0007420 A1* | 1/2024 | Asai | H04L 49/9057 |

* cited by examiner

*Primary Examiner* — Sisley N Kim
(74) *Attorney, Agent, or Firm* — Fox Rothschild LLP

(57) ABSTRACT

A control system of an autonomous vehicle for performing control for effective calculation by parallelizing operations between a plurality of modules of the autonomous vehicle includes the plurality of modules arranged in the autonomous vehicle and configured to perform a connective operation, and a module scheduling system configured to monitor operations of the plurality of modules, to parallelize the plurality of modules using an additional thread, and to control the plurality of modules to aperiodically operate using a pipelining method, and thus, processing capability per hour of a plurality of modules may be optimized by controlling parallel processing of the plurality of modules, and when an entire logic calculation period is longer than a sensor input period, an error due to delay that occurs in a data processing procedure between the modules is overcome.

16 Claims, 8 Drawing Sheets

CONTROL SYSTEM OF AUTONOMOUS VEHICLE AND CONTROL METHOD OF AUTONOMOUS VEHICLE

CROSS-REFERENCE TO RELATED APPLICATION

This application claims under 35 U.S.C. § 119(a) the benefit of Korean Patent Application No. 10-2020-0169677, filed on Dec. 7, 2020, the entire contents of which are incorporated by reference herein.

BACKGROUND

(a) Technical Field

The present disclosure relates to a control system of an autonomous vehicle and a control method of an autonomous vehicle, more particularly, to the control system and control method configured to perform control for effective calculation by parallelizing operations between constituent modules of the autonomous vehicle.

(b) Description of the Related Art

An autonomous vehicle refers to a vehicle that is capable of autonomously traveling without manipulation of a driver or a passenger, and an autonomous driving system refers to a system for monitoring and controlling the autonomous vehicle to autonomously travel.

An autonomous vehicle typically travels based on driving environment information with little or no input from a driver. The autonomous vehicle includes a sensor system including one or more sensors established to detect information related to a vehicle driving environment. The autonomous vehicle travels in a manual mode, a complete autonomous mode, or a partial autonomous mode.

The autonomous driving system may perform complicated calculation in a procedure of determining a driving situation in a complex environment such as a city using a plurality of LiDARs, radars, and cameras. Each sensor has an input period, and as the input period is reduced, a nearby object is more frequently used in determination, and accordingly, a sufficiently short period is required.

FIG. 1 (RELATED ART) is a diagram showing an example of an operational relationship between components of a conventional autonomous vehicle. As shown in FIG. 1, a signal detected by a first sensor Sensor 1 driven using a first clock CLK 1 is transferred and processed by a first module and is processed by a second module using a second clock CLK 2. Then, a signal detected by a second sensor Sensor 2 driven using a third clock CLK 3 is transferred and processed by the first module and is processed by the second module using a fourth clock CLK 4.

In this case, when an autonomous driving logic calculation period is longer than an operating period of a sensor, if a sensing value of a next sensor is input before calculation required for determination of driving is processed, it may be impossible to process the sensing value. When delay between modules occurs, there is a risk that an accident may occur because of an error of autonomous driving due to a difference between received position information of an object and actual position information.

SUMMARY

An object of the present disclosure is to provide a control system and method of an autonomous vehicle for overcoming an error due to delay that occurs in a data processing procedure between plural modules.

Another object of the present disclosure is to provide a control system and method of an autonomous vehicle for improving processing capability per hour of a plurality of modules.

Another object of the present disclosure is to provide a control system and method of an autonomous vehicle for overcoming a problem that occurs when an entire logic calculation period is longer than a sensor input period.

To achieve the object of the present disclosure, the control system and method of the autonomous vehicle may minutely schedule an order of operations of a plurality of modules by parallelizing the modules arranged in the autonomous vehicle.

In an aspect, a control system and method of an autonomous vehicle according to the present disclosure includes a plurality of modules arranged in the autonomous vehicle and configured to perform a connective operation, and a module scheduling system configured to monitor operations of the plurality of modules, to parallelize the plurality of modules using an additional thread, and to control the plurality of modules to aperiodically operate using a pipelining method.

The control system of the autonomous vehicle may include a sensing module unit including a plurality of sensor modules configured to output various pieces of sensing data, a processing module unit configured to process the sensing data provided from a plurality of sensor modules of the sensing module unit, and a control module unit configured to control an operation of autonomous driving using a processing result of the processing module unit.

Each module of the plurality of modules may include a module reception thread configured to aperiodically receive data from a previous module, a reception buffer configured to temporarily store the data received from the module reception thread, a module main thread configured to aperiodically process the data stored in the reception buffer, a transmission buffer configured to temporarily store data based on an operating result of the module main thread, and a module transmission thread configured to aperiodically transmit the data stored in the transmission buffer to another module.

The module scheduling system may include a reception management module configured to receive information on a data reception state from the module reception thread inside the module, to process information on a module processing state from the module main thread inside the module, and to provide a processing command to the module main thread inside the module, and a transmission management module configured to receive the information on the module processing state from the module main thread inside the module, to receive information on a data transmission state from the module transmission thread inside the module, and to provide a transmission command to the module transmission thread inside the module.

The module scheduling system may monitor the module reception thread, the module main thread, and the module transmission thread inside each module and may perform control to parallelize transmission, reception, and processing operations of each of the threads.

The module scheduling system may control the module reception thread to receive second frame data while the module main thread processes first frame data stored in the reception buffer.

The module scheduling system may control the module transmission thread to transmit the processed first frame data stored in the transmission buffer while the module main thread processes the second frame data stored in the reception buffer.

The module scheduling system may control the module reception thread to receive third frame data while the module transmission thread transmits the processed first frame data stored in the transmission buffer.

The reception management module may receive the information on the data reception state from the module reception threads inside each of the modules performing the connective operation and the information on the module processing state from the module main threads inside each of the modules performing the connective operation, and may control a processing operation of the module main thread inside each of the modules, and the transmission management module may receive the information on the module processing state from the module main thread inside each of the modules performing the connective operation and the information on the data transmission state from the module transmission thread inside each of the modules performing the connective operation, and may control a processing operation of the module transmission thread inside each of the modules.

In another aspect, the present disclosure provides a control method of an autonomous vehicle using a module scheduling system for controlling a plurality of modules arranged in the autonomous vehicle and configured to perform a connective operation, including receiving information on a data reception state from a module reception thread inside the module and information on a module processing state from a module main thread inside the module by a reception management module of the module scheduling system, providing a processing command to the module main thread by the reception management module of the module scheduling system, receiving the information on the module processing state from the module main thread and receiving the information on data transmission state from a module transmission thread inside the module by a transmission management module of the module scheduling system, and aperiodically providing a transmission command to the module transmission thread using a pipelining method by the transmission management module of the module scheduling system.

The module scheduling system may monitor the module reception thread, the module main thread, and the module transmission thread inside each module and may perform control to parallelize transmission, reception, and processing operations of each of the threads.

The module scheduling system may control the module reception thread to receive second frame data while the module main thread processes first frame data stored in a reception buffer.

The module scheduling system may control the module transmission thread to transmit the processed first frame data stored in a transmission buffer while the module main thread processes the second frame data stored in the reception buffer.

The module scheduling system may control the module reception thread to receive third frame data while the module transmission thread transmits the processed first frame data stored in a transmission buffer.

In another aspect, the present disclosure provides a control method of an autonomous vehicle using a plurality of modules that each include a module reception thread, a module main thread, and a module transmission thread and perform a connective operation, including aperiodically receiving data provided from a previous module by the module reception thread, storing the received data in a reception buffer immediately after the module reception thread receives data, aperiodically reading and processing the data stored in the reception buffer by the module main thread immediately after the data of the reception buffer is updated, storing the processed data in the transmission buffer immediately after the module main thread completely processes data, and aperiodically transmitting the data stored in the transmission buffer to a next module by the module transmission thread immediately after the data of the transmission buffer is updated, wherein at least two of a data transmission and reception procedure and a data transmission procedure are simultaneously performed.

When the module reception thread stores a packet in the reception buffer after receiving the packet and a reception flag is in an ON-state, and when the module main thread completely processes a current frame and a data processing flag is in an ON-state, a processing command flag of a reception management module may be processed to an ON-state.

When the module main thread completely processes the current frame and a data processing flag is in an ON-state, and when the module transmission thread does not transmit data and a data transmission flag is in an OFF-state, a processing command flag of a transmission management module may be processed to an ON-state.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
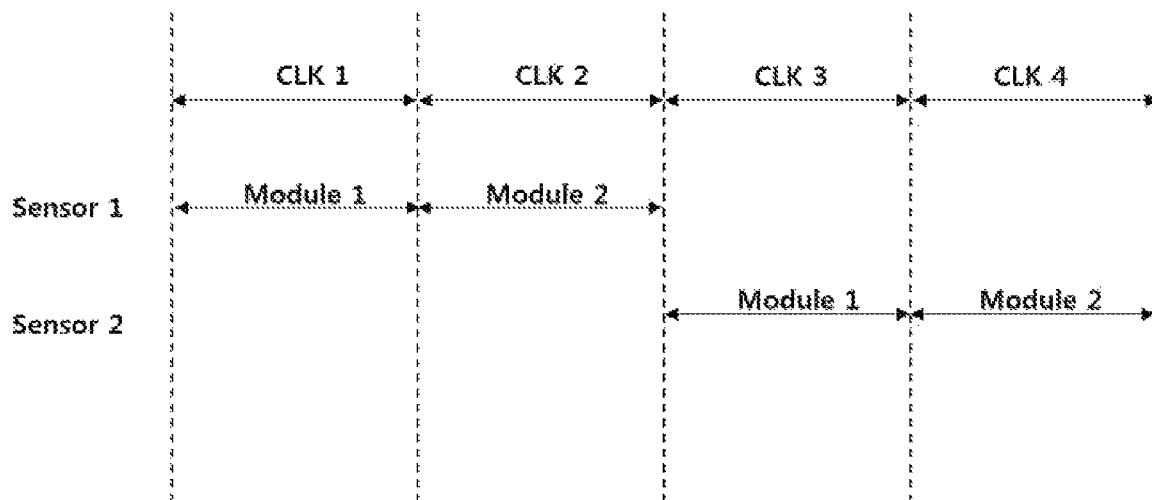
FIG. 1 (RELATED ART) is a diagram showing an example of an operational relationship between components of a conventional autonomous vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In exemplary embodiments of the present disclosure disclosed in the specification, specific structural and functional descriptions are merely illustrated for the purpose of illustrating embodiments of the disclosure and exemplary embodiments of the present disclosure may be embodied in many forms and are not limited to the embodiments set forth herein.

Exemplary embodiments of the present disclosure can be variously changed and embodied in various forms, in which illustrative embodiments of the disclosure are shown. However, exemplary embodiments of the present disclosure should not be construed as being limited to the embodiments set forth herein and any changes, equivalents or alternatives which are within the spirit and scope of the present disclosure should be understood as falling within the scope of the disclosure.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present inventive concept. Thus, the singular expressions in the present specification include the plural expressions unless clearly specified otherwise in context.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When exemplary embodiments are embodied in various ways, a function or operation stated in a specific block may be executed in a different way from an order stated in a flowchart. For example, two consecutive blocks may be substantially simultaneously executed and may be reversely executed according to a related function or operation.

Hereinafter, the construction and the operation of a control system of an autonomous vehicle will be described with reference to the accompanying drawings.

Figure 2:
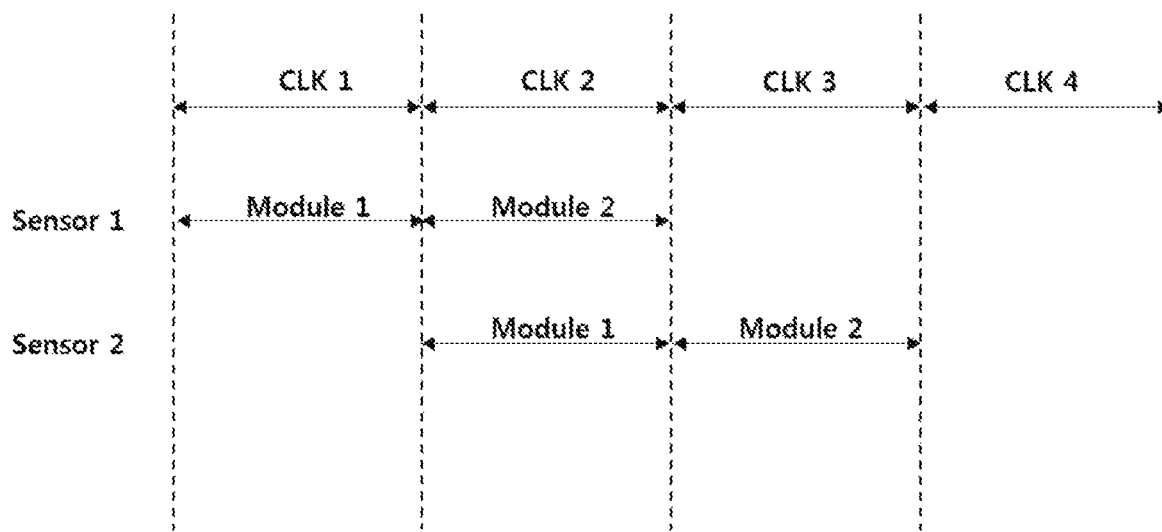
FIG. 2 is a schematic diagram showing an example of an operational relationship between constituent modules in a control system of an autonomous vehicle according to the present disclosure.

FIG. 2 is a schematic diagram showing an example of an operational relationship between constituent modules in a control system of an autonomous vehicle according to the present disclosure. As shown in FIG. 2, a signal detected by a first sensor Sensor 1 driven using a first clock CLK 1 may be transferred and processed by a first module. Data processed by the first module using a second clock CLK 2 may be processed by a second module, and simultaneously, a signal detected by a second sensor Sensor 2 may be transferred and processed by the first module. Then, the data processed by the first module may be processed by the second module using a third clock CLK 3.

That is, the control system of the autonomous vehicle according to the present disclosure may reduce the processing time of all modules by controlling the vehicle to allow a next module to aperiodically perform an operation immediately after an operation of a previous module is terminated.

Figure 3:
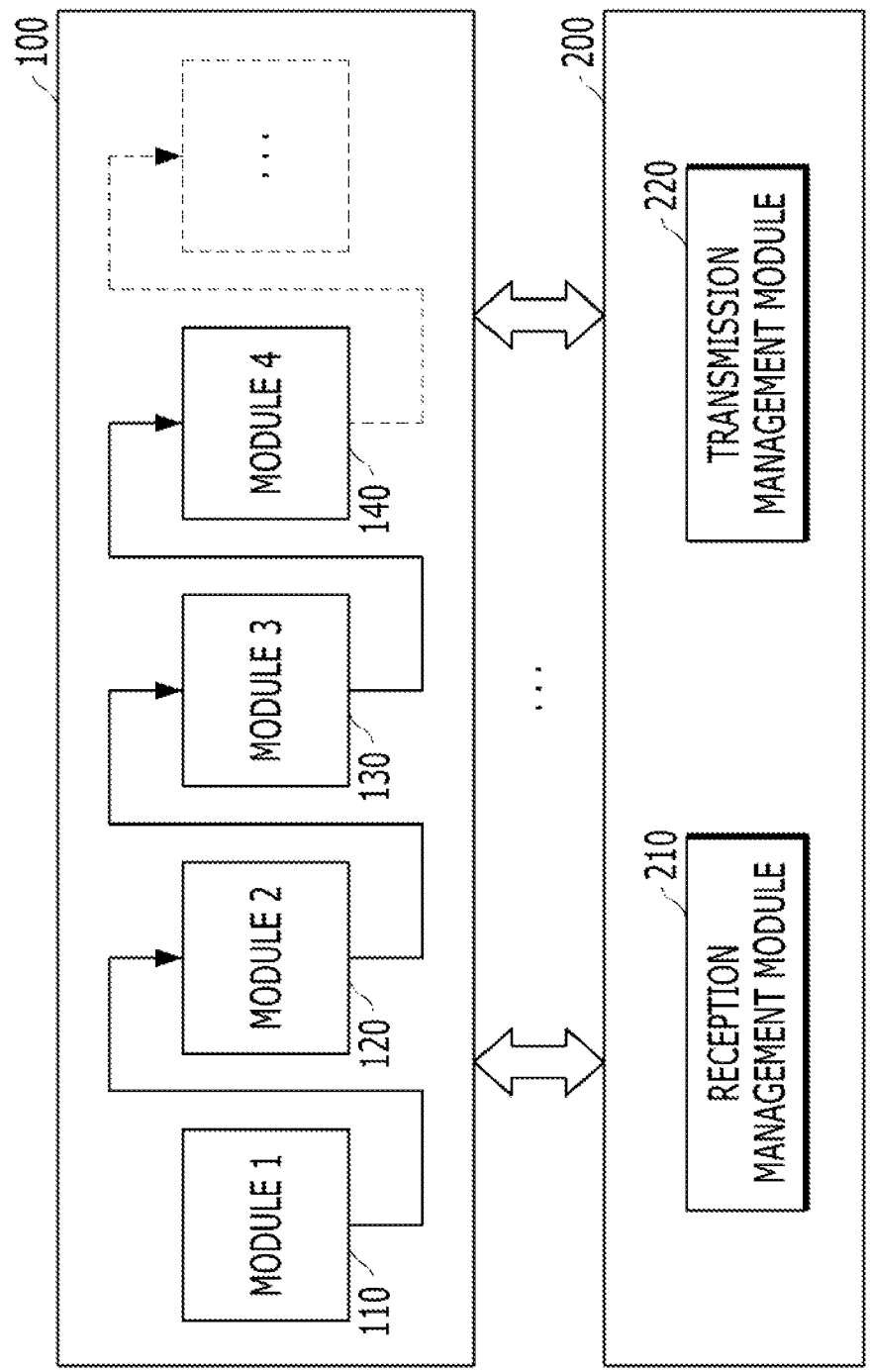
FIG. 3 is a block diagram showing the configuration of the configuration of a control system of an autonomous vehicle according to the present disclosure.

FIG. 3 is a block diagram showing the configuration of the configuration of a control system of an autonomous vehicle according to the present disclosure. The control system may include a plurality of modules 100 that are arranged in the autonomous vehicle and perform a connective operation, and a module scheduling system 200 that monitors the plurality of modules, and a module scheduling system 200 that parallelize the plurality of modules using an additional thread and controls the plurality of modules to aperiodically operate using a pipelining method.

As shown in FIG. 3, the plurality of modules 100 may be configured in such a way that an order thereof is not changed. That is, result data of a module 1 110 may be transferred to a module 2 120, and then a processing result by the module 2 120 may be transferred to and processed by a module 3 130.

The plurality of modules 100 may be classified into a sensing module unit, a processing module unit, and a control module unit depending on the functional characteristics thereof.

The sensing module unit may include a LiDAR, a RaDAR, a camera, an ultrasonic sensor, or the like. The LiDAR may measure a distance, an altitude, and a direction of a nearby object by emitting a laser pulse and receiving light that is reflected by the nearby object and returns. The RaDAR may measure the distance, the altitude, and the direction of an object by transmitting a radio signal and receiving a received radio signal when the transmitted radio signal is reflected by a nearby structure. The camera may generate image data by photographing front, rear, and right/left sides of a vehicle. The ultrasonic sensor may measure the distance, the altitude, and the direction of an object by transmitting ultrasonic waves and receiving a reflected signal when the transmitted waves are reflected by a nearby structure. The control system may include various sensors, and for example, may include an in-vehicle sensor positioned within the vehicle and for monitoring the state of a driver, a plurality of infrared ray sensors installed at front, rear, and right/left sides of the vehicle and for detecting the proximity of an object, or sensors for sensing a nearby environment of the vehicle, for example, an impact sensor, an illuminance sensor, or a humidity sensor for sensing impact applied to the vehicle, or the illuminance or the humidity of the vehicle and providing information required to control a vehicular driver to a controller. In addition, the control system may calculate the moving distance and the direction of the vehicle using sensor values that are measured by a gyro sensor, a speed sensor, an acceleration sensor, and the like.

The processing module unit may process the sensing data provided from a plurality of sensor modules of the sensing module unit. In this case, the processing module unit may be configured according to one-to-one correspondence to each sensor module of the sensing module unit, and as necessary, information of the plurality of sensor modules may be divided and provided by one processing module unit. The control module unit may control an operation of autonomous driving using the processing result of the processing module unit.

The processing module unit and the control module unit may include any various types of processing device. For example, one or all of the processing module unit and the control module unit may include a microprocessor, a preprocessor (e.g., an image preprocessor), a graphic processor, a central processing unit (CPU), an auxiliary circuit, a digital signal processing device, an integrated circuit, or an appropriate type of device for executing an application and processing and analyzing an image. In some embodiments, the processing module unit and/or the control module unit may include a single or multiple core processor, a micro controller, and one type of CPUs.

For example, when the module 1 110 is a camera, the module 2 120 may be an object recognizer for receiving an image acquired by the camera and recognizing an object. For example, the object recognizer may perform an operation of recognizing whether the object is a moving installation or a fixed installation. Information on the object recognized by the module 2 120 may be transferred to the module 3 130, and the module 3 130 may control the vehicle using various methods such as a lane change, an acceleration change, a speed change, or braking.

The module scheduling system 200 may include a reception management module 210 for monitoring an operation of each module and performing parallelization control related to data reception and data processing of each module, and a transmission management module 220 for monitoring an operation of each module and performing parallelization control related to data processing and data transmission of each module.

Figure 4:
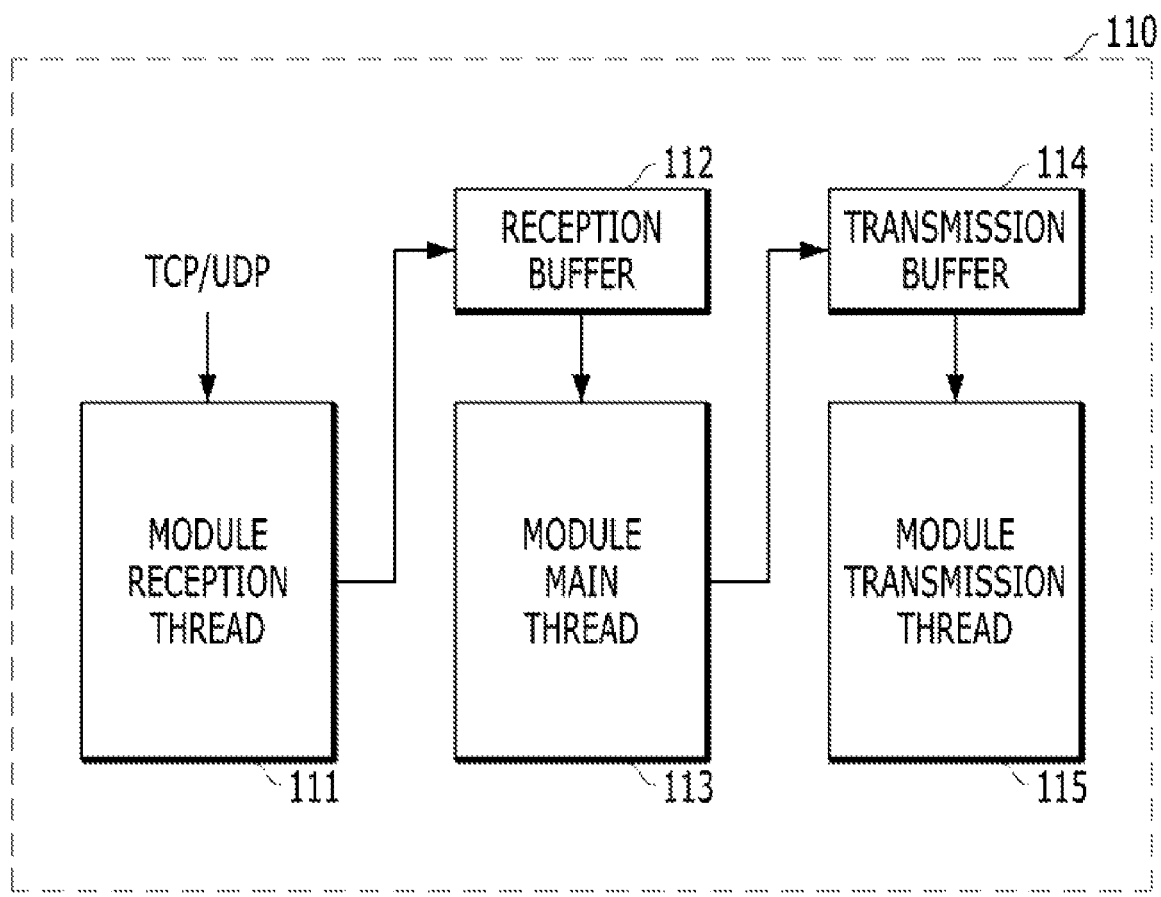
FIG. 4 is a block diagram showing the configuration of each module of a control system of an autonomous vehicle according to the present disclosure.

FIG. 4 is a block diagram showing the configuration of each module of a control system of an autonomous vehicle according to the present disclosure. In this example, although the module 1 110 is illustrated, all the module of the plurality of modules 100 may include the same components.

The module 1 110 may include a module reception thread 111 for aperiodically receiving data using a transmission control protocol (TCP) or user datagram protocol (UDP) protocol method from a previous module, a reception buffer 112 for temporarily storing the data received from the module reception thread 111, a module main thread 113 for aperiodically processing the data stored in the reception buffer 112, a transmission buffer 114 for temporarily storing data based on an operating result of the module main thread 113, and a module transmission thread 115 for aperiodically transmitting the data stored in the transmission buffer 114 to another module.

Figure 5:
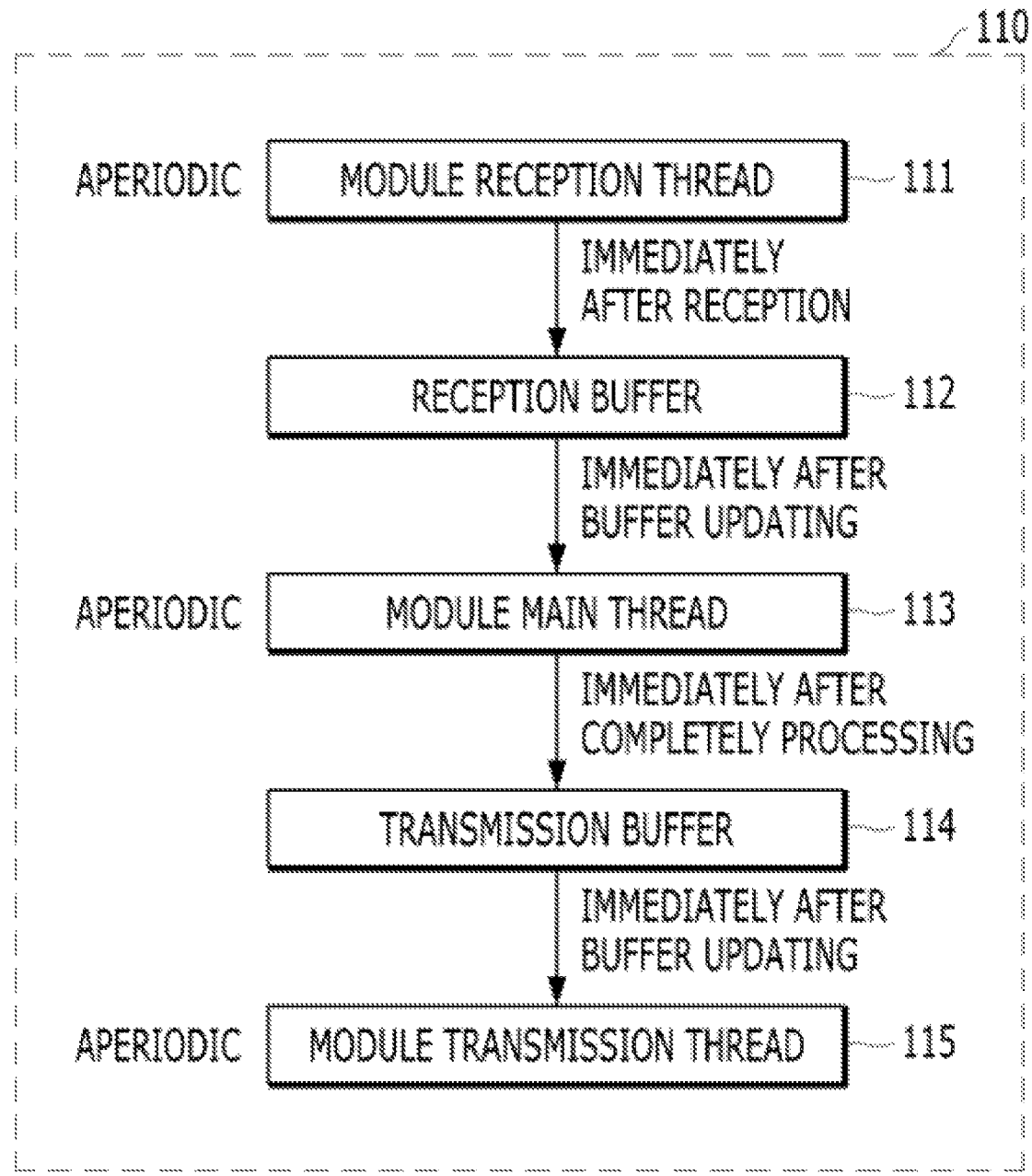
FIG. 5 is a schematic diagram showing an example of each module of a control system of an autonomous vehicle according to the present disclosure.

FIG. 5 is a schematic diagram showing an example of each module of a control system of an autonomous vehicle according to the present disclosure. For example, the module reception thread 111 of the module 1 110 may perform an operation of storing data in the reception buffer 112 immediately after aperiodically receiving data. The module main thread 113 of the module 1 110 may read and process the data stored in the reception buffer 112 immediately after aperiodically updating the reception buffer 112. Then, an operation of storing the processed data in the transmission buffer 114 may be performed immediately after the data is completely processed. The module transmission thread 115 of the module 1 110 may aperiodically read the data stored in the transmission buffer 114 immediately after the transmission buffer 114 is updated and may perform an operation of transmitting the data to the module 2 120 as a next module.

Figure 6A:
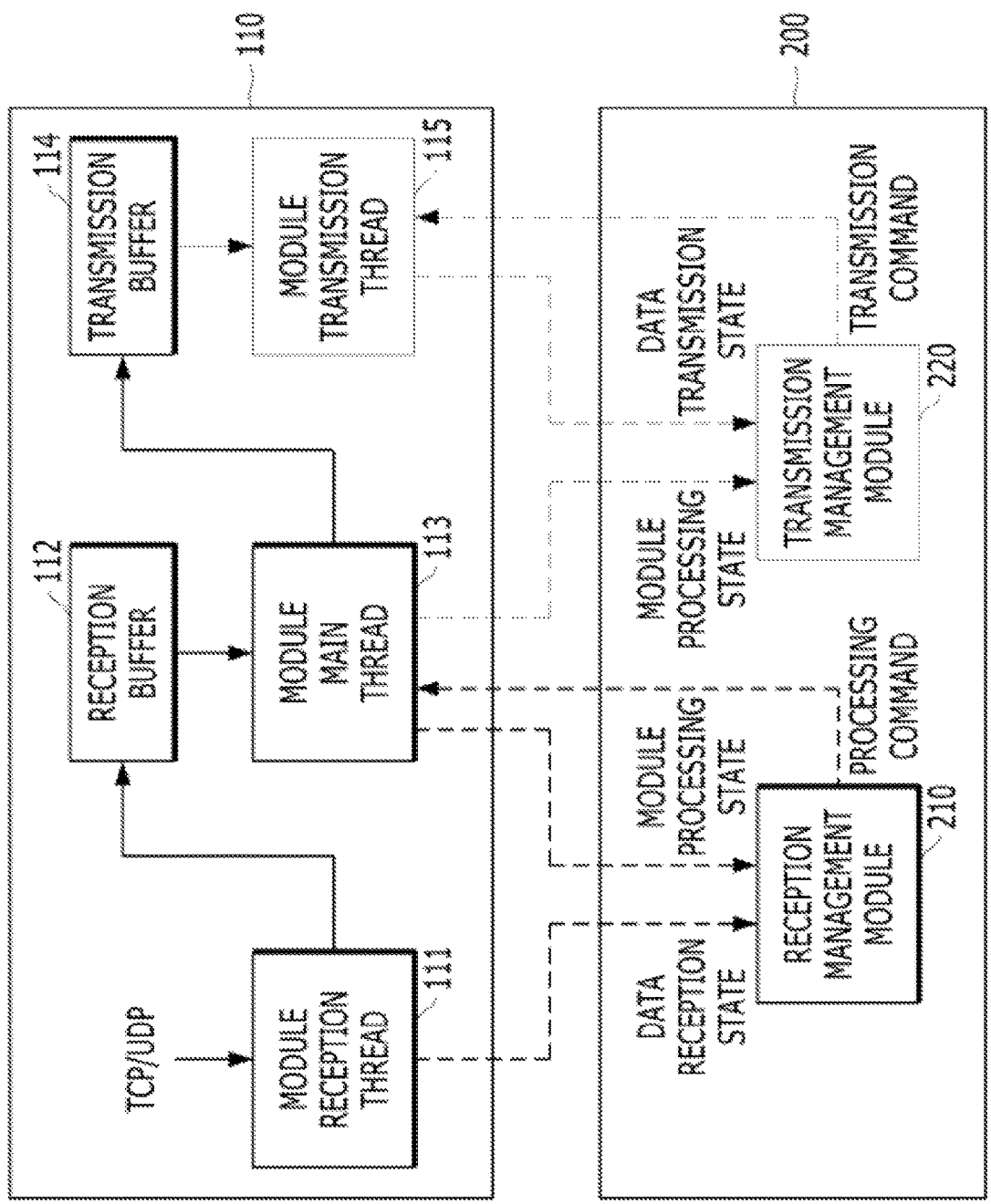
FIG. 6a is a schematic diagram showing an operation under control of a reception management module in a control system of an autonomous vehicle according to the present disclosure.

FIG. 6a is a schematic diagram showing an operation under control of a reception management module in a control system of an autonomous vehicle according to the present disclosure. The reception management module 210 may receive a data reception state from the module reception thread 111 inside the module 1 110, may receive a module processing state from the module main thread 113 inside the module 1 110, and may provide a processing command to the module main thread 113 inside the module 1 110. The module main thread 113 may store the processed data in the transmission buffer 114 according to control of the reception management module 210.

The data reception state means that a "data reception flag" indicates an ON-state at the time when the module reception thread 111 receives a data packet and inputs the same to the reception buffer.

The module processing state means that a "data processing flag" indicates an ON-state when the module main thread 113 completely processes a current frame.

A processing command condition of the reception management module 210 means that a "processing command flag" indicates an ON-state when the "data reception flag" of the module reception thread 111 is in an ON-state and the "data processing flag" of the module main thread 113 is in an ON-state.

When corresponding flags are present in the same application, the flags may also share variables and may be embodied alone so as not to overlap each other using a global variable and mutual exclusion Mutex. When corresponding flags are present in different applications, the flags may also be transferred and may be embodied using a shared variable using TCP/UDP socket programing or other any type of communication method. The reception management module 210 may be operated as one independent application or thread in order to minimize influence of other modules, but the present disclosure is not limited thereto.

Figure 6B:
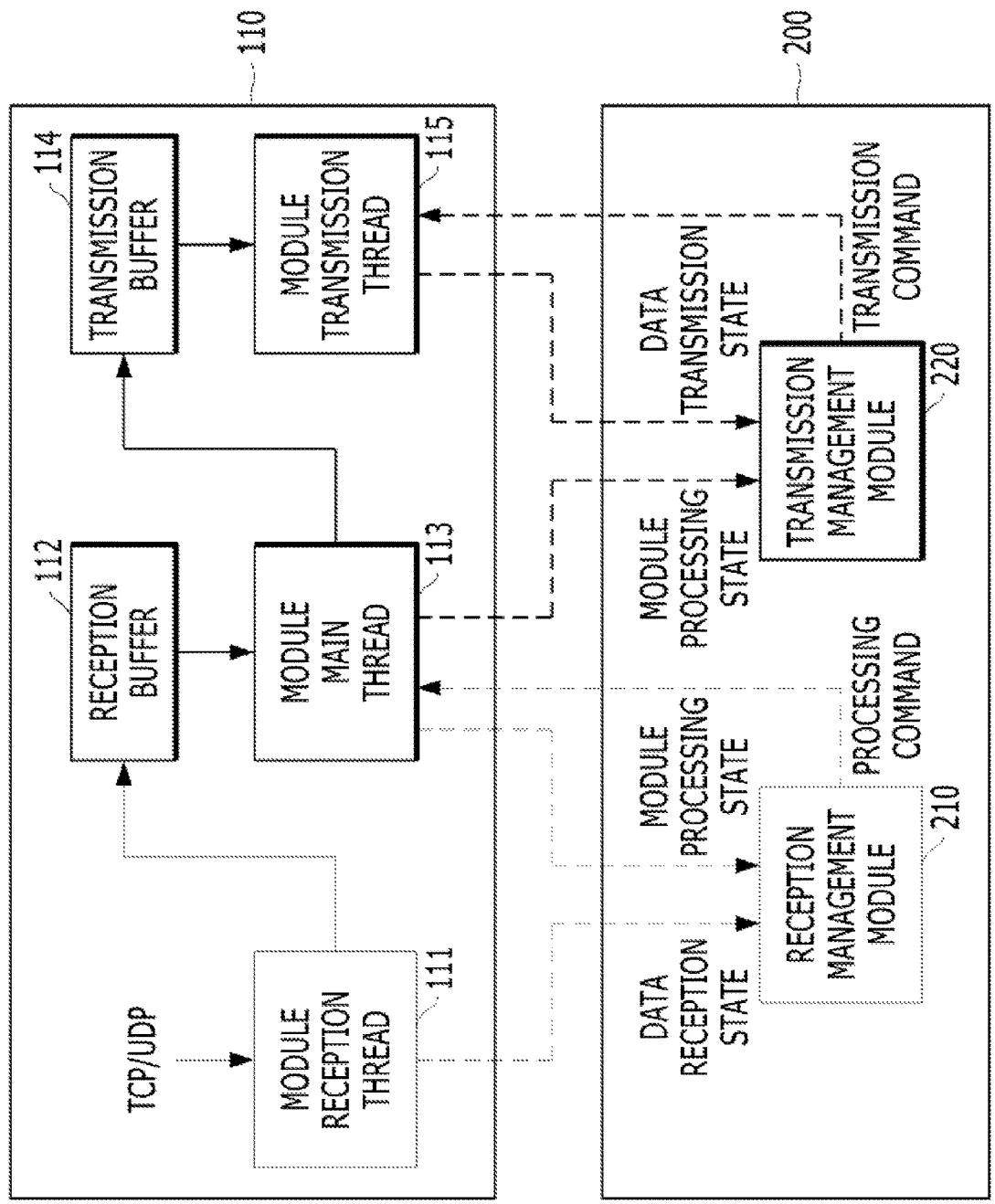
FIG. 6b is a schematic diagram showing an operation under control of a transmission management module in a control system of an autonomous vehicle according to the present disclosure.

FIG. 6b is a schematic diagram showing an operation under control of a transmission management module in a control system of an autonomous vehicle according to the present disclosure.

The transmission management module 220 may receive a module processing state from the module main thread 113 inside the module 1 110, may receive a data transmission state from the module transmission thread 115 inside the module 1 110, and may a transmission command to the module transmission thread 115 inside the module 1 110. The module transmission thread 115 may transmit data stored in the transmission buffer 114 to the module 2 120 under control of the transmission management module 220.

The module processing state means that a "data processing flag" indicates an ON-state when the module main thread 113 completely processes a current frame.

The data transmission state means that a "data transmission flag" indicates an OFF-state when the module transmission thread 115 is not currently in a transmission state. A transmission command condition of the transmission management module 220 means that a "data processing flag" of the module main thread 113 indicates an ON-state and that a "data transmission flag" of the module transmission thread 115 indicates an OFF-state. When corresponding flags are present in the same application, the flags may also share variables and may be embodied alone so as not to overlap each other using a global variable and mutual exclusion Mutex. When corresponding flags are present in different applications, the flags may also be transferred and may be embodied using a shared variable using TCP/UDP socket programing or other any type of communication method. The transmission management module 220 may be operated as one independent application or thread in order to minimize influence of other modules, but the present disclosure is not limited thereto.

Figure 7:
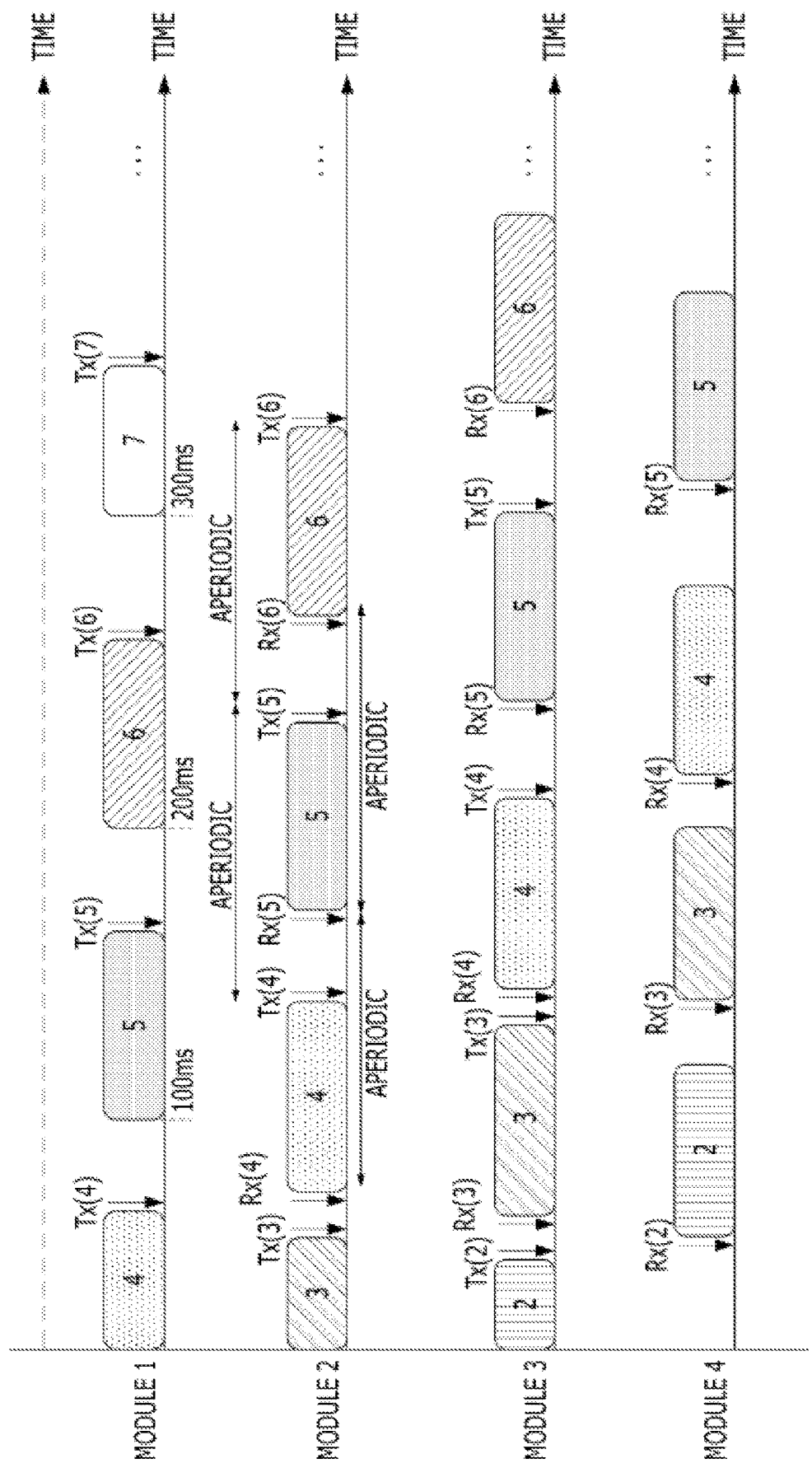
FIG. 7 is a schematic diagram showing an example of the case in which delay occurs during scheduling of each module in a control system of an autonomous vehicle according to the present disclosure.

FIG. 7 is a schematic diagram showing an example of the case in which delay occurs during scheduling of each module in a control system of an autonomous vehicle according to the present disclosure. In a conventional control system of an autonomous vehicle, threads inside respective modules have the same operating period, and reception, processing, and transmission operations are also performed based on a next operating period at the time when an operation of a previous module is completed, and thus delay may occur. When a calculation period of a previous module is long, if an input value of a next sensor is input before calculation required for determination of driving is processed, it may be impossible to process the input value. According to the present disclosure, the module scheduling system 200 may monitor the operations of the module reception thread, the module main thread, and the module transmission thread inside each module of the plurality of modules 100 and may control threads to organically operate at the appropriate time to perform pipelining.

In the following description, an operation in which the module 1 110 receives and processes sensing information at a sensor period of 100 ms and then transmits the sensing information to the module 2 120 will be exemplified, and with reference to the exemplified drawing, a procedure of processing fourth frame data from an arbitrary time in the state in which each module is operating.

For example, when the module 1 110 completely processes the fourth frame data, the module scheduling system 200 that is monitoring this may check the state of the module 2 120. The module 2 120 may completely process third frame data, and the transmission management module 220 of the module scheduling system 200 that checks the state in which the third frame data is transmitted to the module 3 130 ($Tx_{(3)}$) may supply a transmission command to the module transmission thread 115 of the module 1 110. Thus, the module transmission thread 115 of the module 1 110 may transmit the fourth frame data stored in the transmission buffer 114 to the module 2 120 ($Tx_{(4)}$). Then, the reception management module 210 of the module scheduling system 200 may transmit a processing command to a module reception thread of the module 2 120 and the module reception thread of the module 2 120 may receive the processed fourth frame data from the module 1 110 ($Rx_{(4)}$).

The module 1 110 processes the fourth frame data and transmits the same to the module 2 120, and thus the reception management module 210 of the module scheduling system 200 that is monitoring this procedure may transfer a reception command to the module reception thread 111. The module reception thread 111 of the module 1 110 may begin to receive fifth frame data in a next operating period, i.e., a time of 100 ms and the module main thread 113 may process the fifth frame data.

The module scheduling system 200 that monitors completion of processing of the fourth frame data by a module main thread of the module 2 120 may check the state of the module 3 130 at a corresponding time. The module scheduling system 200 that monitors completion of processing of the third frame data by the module 3 130 may control a module transmission thread of the module 3 130 to transmit the processed third frame data to a module 4 140 ($Tx_{(3)}$). Then, the module scheduling system 200 may control a module transmission thread of the module 2 120 to transmit the processed fourth frame data stored in a transmission buffer to the module 3 130 ($Tx_{(4)}$). A module reception thread of the module 3 130 may receive the processed fourth frame data from the module 2 120 according to the received control signal provided from the module scheduling system 200 ($Rx_{(4)}$).

The module scheduling system 200 that monitors completion of processing of the fourth frame data by a module main thread of the module 3 130 may check the state of the module 4 140 at a corresponding time. The module scheduling system 200 that checks completion of processing of the third frame data by the module 4 140 may control the module transmission thread of the module 3 130 to transmit the processed fourth frame data to the module 4 140 ($Tx_{(4)}$). A module reception thread of the module 4 140 may receive the processed fourth frame data from the module 3 130 according to the received control signal provided from the module scheduling system 200 ($Rx_{(4)}$).

As described above, an arbitrary module of the module scheduling system 200 may monitor data processing of the module reception thread, the module main thread, and the module transmission thread and may control an operation of the module reception thread of a next module of a corresponding module transmission thread depending on a data processing state of the next module at a corresponding time.

Figure 8:
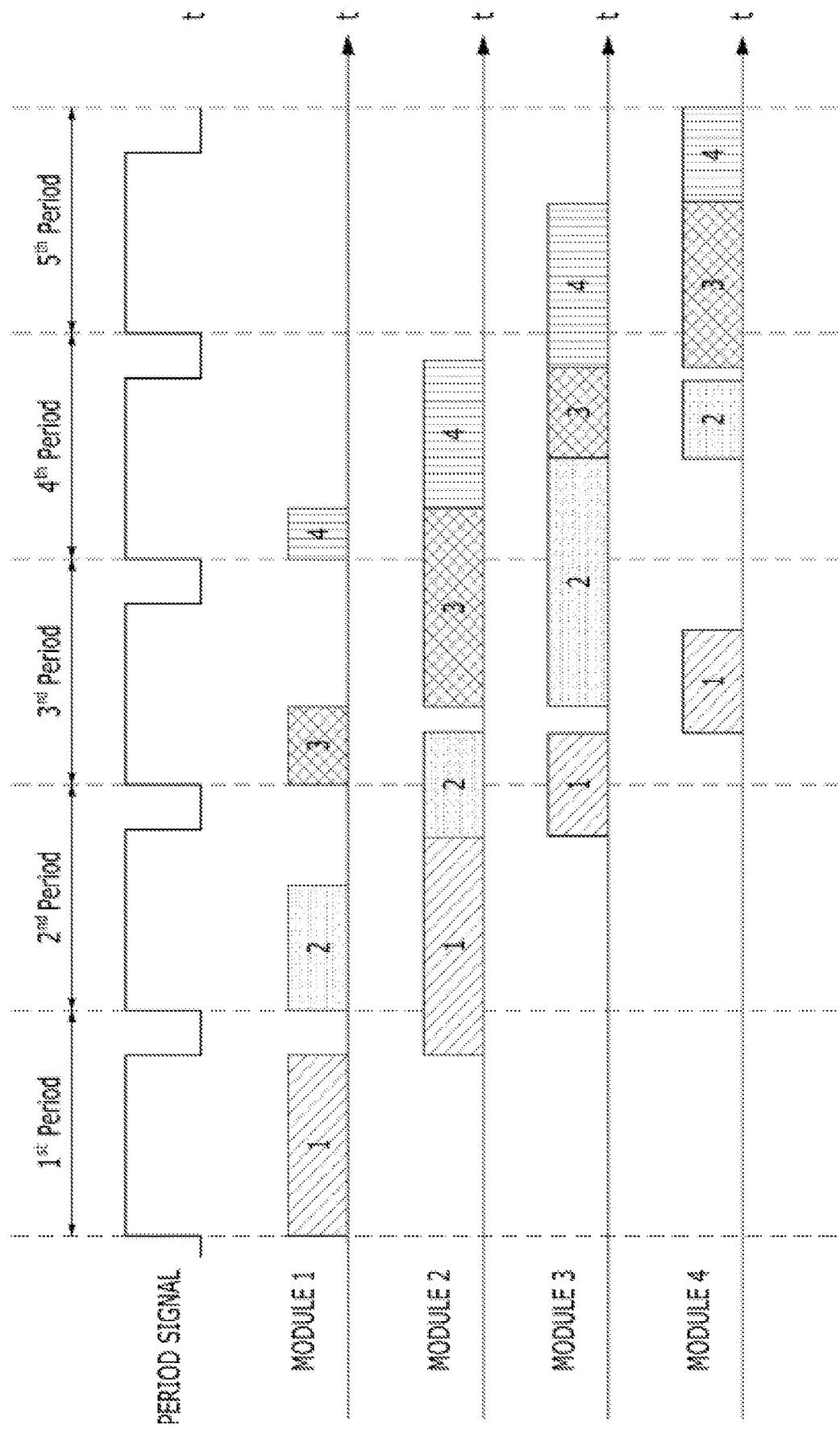
FIG. 8 is a schematic diagram showing an example of an operation of each module in each period in a control system of an autonomous vehicle according to the present disclosure.

FIG. 8 is a schematic diagram showing an example of an operation of each module in each period in a control system of an autonomous vehicle according to the present disclosure.

Hereinafter, a period refers to one example of a sensing period of a sensor module, but the present disclosure is not limited thereto. To aid in understanding of an operation, the case in which the first module is a "camera" that is one of sensor modules, for example, a camera, a LiDAR, a laser, an ultrasonic sensor, or a GPS, the second module is "image pre-processing processor", the third module is a "driving controller", and the fourth module is a "steering device" will be exemplified.

As a first period begins, the module 1 110 may process sensing data provided from the camera. The module scheduling system 200 that monitors the state of the module 1 may provide a control signal for transmitting the processed first frame data to the module transmission thread 115 of the module 1 and may provide a control signal for receiving the processed first frame data to the module reception thread of the module 2 120. Processing of the module 1 110 may be terminated before the second period begins, and thus the module 2 may receive the processed first frame data even before a second period begins.

In the state in which the module 1 110 receives the second frame data and terminates corresponding processing as the second period begins, the module scheduling system 200 may check the state of the module 2 120 at a corresponding time. The module scheduling system 200 may check that the module 2 120 is still processing the first frame data and the time when the module 2 120 terminates processing of the first frame data. The module scheduling system 200 that checks the module 2 120 terminates processing of the first frame data may provide a control signal for transmitting the processed second frame data to the module 2 120, to the module 1 110, may provide a control signal for transmitting the processed first frame data to the module 3 130 and a control signal for receiving the processed second frame data, to the module 2 120, and may provide a control signal for receiving the processed first frame data to the module 3 130.

In a third period, the module scheduling system 200 that checks the module 2 120 completely processes the second frame data may check the state of the module 3 130 at a corresponding time. In the state in which the module 1 110 receives the third frame data and terminates corresponding processing, the module scheduling system 200 may check the states of the module 2 120, the module 3 130, and the module 4 140 at a corresponding time. The module scheduling system 200 that checks that the module 2 120 completes processing of the second frame data may provide a control signal for transmitting the processed second frame data to the module 2 120, may provide a control signal for transmitting the processed first frame data to the module 4 140 and a control signal for receiving the processed second frame data from the module 2 120, to the module 3 130 that completely processes the first frame data, and may provide a control signal for receiving the processed first frame data from the module 3 130, to the module 4 140.

Then, the module scheduling system 200 may check the operating states of the module 2 120 and the module 3 130 at the time when the module 1 110 completes processing of the third frame data. The module scheduling system 200 may provide a control signal for transmitting the processed third frame data to the module 1 110, may provide a control signal for transmitting the processed second frame data to the module 3 130 and a control signal for receiving the third frame data processed by the module 1 110, to the module 2 120 that completely processes the second frame data, and may provide a control signal for receiving the second frame data processed by the module 2 120, to the module 3 130 that completely processes the first frame data.

In a fourth period, the module scheduling system 200 may check the operating states of the module 2 120 and the module 3 130 at the time when the module 1 110 completely processes the fourth frame data. The module 3 130 is still processes the second frame data, and thus the module scheduling system 200 that checks that the module 2 120 completely processes the third frame data may provide a control signal for receiving the fourth frame data processed by the module 1 110 to the module 2 120 but may not provide a control signal for reception to the module 3 130. After a predetermined period elapses, the module scheduling system 200 that checks that the module 3 130 completely processes the second frame data may provide a control signal for transmitting the processed third frame data to the module 3 130, to the module 2 120, may provide a control signal for transmitting the completely processed second frame data to the module 4 140 and a control signal for receiving the third frame data processed by the module 2 120, to the module 3 130, and may provide a control signal for receiving the second frame data processed by the module 3 130, to the module 4 140.

The module scheduling system 200 that monitors the current operating states of a plurality of modules in real time may provide a processing command, a transmission command, and a reception command depending on the operating states of reception, main, and transmission threads of a predetermined module, may check the operating state of a next module at the time when processing of a previous module between a plurality of modules is completed, and may immediately supply transmission and reception control signals to the previous module and the next module, respectively, at the time when it is possible to process the next module.

As described above, processing capability per hour of a plurality of modules may be improved by controlling parallel processing of the plurality of modules of the control system of the autonomous vehicle, and accordingly, when an entire logic calculation period is longer than a sensor input period, an error due to delay that occurs in a data processing procedure between the modules may be overcome.

The control system of the autonomous vehicle according to the present disclosure may have the following effects.

First, an error due to delay that occurs in a data processing procedure between plural modules may be overcome.

Second, processing capability per hour of a plurality of modules may be improved.

Third, a problem that occurs when an entire logic calculation period is longer than a sensor input period may be overcome.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A control system of an autonomous vehicle, comprising:
a plurality of modules arranged in the autonomous vehicle and configured to perform a connective operation; and
a module scheduling system configured to monitor operations of the plurality of modules, to parallelize the plurality of modules using an additional thread, and to control the plurality of modules to aperiodically operate using a pipelining method, wherein the module scheduling system comprises:
a reception management module configured to monitor an operation of each module and to perform parallelization control related to data reception and data processing of each module; and
a transmission management module configured to monitor an operation of each module and to perform parallelization control related to data processing and data transmission of each module,
wherein the plurality of modules comprise:
a sensing module unit comprising a plurality of sensor modules configured to output various pieces of sensing data;
a processing module unit configured to process the sensing data provided from the plurality of sensor modules of the sensing module unit; and
a control mod red control an operation of autonomous driving using a processing result of the processing modules unit;
wherein each module of the plurality of modules compromises:
a module reception thread configured to periodically receive data from a previous module;
a reception buffer configured to temporality store the data from the module reception thread;
a module main thread configured to aperiodically process the data stored in the reception buffer;
a transmission buffer configured to temporarily store data based on an operating result of the module main thread; and
a module transmission thread configured to aperiodically transmit the data stored in the transmission buffer to another module;
wherein the reception management module is configured to receive information on a data reception state from the module reception thread inside the module, to process information on a module processing state from the module main thread inside the module, and to provide a processing command to the module main thread inside the module; and
wherein the transmission at module is configured to receive e information on the module processing state from the module main thread inside the module, to receive information on a data transmission state from the module transmission thread inside the module, and to provide a transmission command to the module transmission thread inside the module.

2. The control system of the autonomous vehicle of claim 1, wherein the module scheduling system monitors the module reception thread, the module main thread, and the module transmission thread inside each module and performs control to parallelize transmission, reception, and processing operations of each of the threads.

3. The control system of the autonomous vehicle of claim 2, wherein the module scheduling system controls the module reception thread to receive second frame data while the module main thread processes first frame data stored in the reception buffer.

4. The control system of the autonomous vehicle of claim 2, wherein the module scheduling system controls the module transmission thread to transmit the processed first frame data stored in the transmission buffer while the module main thread processes the second frame data stored in the reception buffer.

5. The control system of the autonomous vehicle of claim 2, wherein the module scheduling system controls the module reception thread to receive third frame data while the module transmission thread transmits the processed first frame data stored in the transmission buffer.

6. The control system of the autonomous vehicle of claim 4, wherein:
the reception management module receives the information on the data reception state from the module reception threads inside each of the modules performing the connective operation and the information on the module processing state from the module main threads inside each of the modules performing the connective operation, and controls a processing operation of the module main thread inside each of the modules; and
the transmission management module receives the information on the module processing state from the module main thread inside each of the modules performing the connective operation and the information on the data transmission state from the module transmission thread inside each of the modules performing the connective operation, and controls a processing operation of the module transmission thread inside each of the modules.

7. A control method of an autonomous vehicle using a module scheduling system for controlling a plurality of modules arranged in the autonomous vehicle and configured to perform a connective operation, the method comprising:
receiving information on a data reception state from a module reception thread inside the module and information on a module processing state from a module main thread inside the module by a reception management module of the module scheduling system;
providing a processing command to the module main thread by the reception management module of the module scheduling system;
receiving the information on the module processing state from the module main thread and receiving the information on data transmission state from a module transmission thread inside the module by a transmission management module of the module scheduling system; and
aperiodically providing a transmission command to the module transmission thread using a pipelining method by the transmission management module of the module scheduling system.

8. The method of claim 7, wherein the module scheduling system monitors the module reception thread, the module main thread, and the module transmission thread inside each module and performs control to parallelize transmission, reception, and processing operations of each of the threads.

9. The method of claim 8, wherein the module scheduling system controls the module reception thread to receive second frame data while the module main thread processes first frame data stored in a reception buffer.

10. The method of claim 8, wherein the module scheduling system controls the module transmission thread to transmit the processed first frame data stored in a transmission buffer while the module main thread processes the second frame data stored in the reception buffer.

11. The method of claim 8, wherein the module scheduling system controls the module reception thread to receive third frame data while the module transmission thread transmits the processed first frame data stored in a transmission buffer.

12. The method of claim 7, wherein the plurality of modules comprises:
   a sensing module unit comprising a plurality of sensor modules configured to output various pieces of sensing data;
   a processing module unit configured to process the sensing data provided from a plurality of sensor modules of the sensing module unit; and
   a control module unit configured to control an operation of autonomous driving using a processing result of the processing module unit.

13. The method of claim 7, wherein the reception management module and/or the transmission management module operate as one independent application.

14. The method of claim 7, wherein the module scheduling system checks an operating state of a next module at a time when processing of a previous module between the plurality of modules is completed, and immediately supplies transmission and reception control signals to the previous module and the next module, respectively, at a time when it is possible to process the next module.

15. A control method of an autonomous vehicle using a plurality of modules that each comprise a module reception thread, a module main thread, and a module transmission thread and perform a connective operation, the method comprising:
   aperiodically receiving data provided from a previous module by the module reception thread;
   storing the received data in a reception buffer immediately after the module reception thread receives data;
   aperiodically reading and processing the data stored in the reception buffer by the module main thread immediately after the data of the reception buffer is updated;
   storing the processed data in the transmission buffer immediately after the module main thread completely processes data; and
   aperiodically transmitting the data stored in the transmission buffer to a next module by the module transmission thread immediately after the data of the transmission buffer is updated,
   wherein at least two of a data transmission and reception procedure and a data transmission procedure are simultaneously performed; and
   wherein, when the module reception thread stores a packet in the reception buffer after receiving the packet and a reception flag is in an ON-state, and when the module main thread completely processes a current frame and a data processing flag is in an ON-state, a processing command flag of a reception management module is processed to an ON-state.

16. The method of claim 15, wherein, when the module main thread completely processes the current frame and a data processing flag is in an ON-state, and when the module transmission thread does not transmit data and a data transmission flag is in an OFF-state, a processing command flag of a transmission management module is processed to an ON-state.

* * * * *